(12) United States Patent
Radzevich et al.

(10) Patent No.: US 8,460,148 B2
(45) Date of Patent: Jun. 11, 2013

(54) GEAR SET FOR DIFFERENTIAL

(75) Inventors: Stephen P. Radzevich, Sterling Heights, MI (US); Paul N. Herrmann, Clinton Township, MI (US)

(73) Assignee: Eaton Corporation, Cleveland, OH (US)

( * ) Notice: Subject to any disclaimer, the term of this patent is extended or adjusted under 35 U.S.C. 154(b) by 276 days.

(21) Appl. No.: 12/813,922

(22) Filed: Jun. 11, 2010

(65) Prior Publication Data

US 2010/0323840 A1    Dec. 23, 2010

Related U.S. Application Data

(60) Provisional application No. 61/187,764, filed on Jun. 17, 2009.

(51) Int. Cl.
*F16H 48/06* (2006.01)

(52) U.S. Cl.
USPC ............ 475/230; 475/220; 475/248; 475/252

(58) Field of Classification Search
USPC .................................. 475/220, 230, 236, 344
See application file for complete search history.

(56) References Cited

U.S. PATENT DOCUMENTS

| | | | | |
|---|---|---|---|---|
| 1,396,225 A | * | 11/1921 | Logue et al. | .................. 475/226 |
| 1,711,546 A | * | 5/1929 | Scurlock | ........................ 475/226 |
| 3,237,483 A | | 3/1966 | Kelley et al. | |
| 3,253,483 A | | 5/1966 | McCaw | |
| 3,706,239 A | | 12/1972 | Myers | |
| 4,004,471 A | | 1/1977 | Keske | |
| 4,248,105 A | | 2/1981 | Downing et al. | |
| 4,791,832 A | | 12/1988 | McCaw | |
| 5,030,185 A | | 7/1991 | Kawamura | |
| 5,233,757 A | * | 8/1993 | Maguire | ...................... 29/893.1 |
| 5,472,385 A | | 12/1995 | Vu | |
| 5,984,823 A | | 11/1999 | Gage | |
| 6,599,217 B2 | | 7/2003 | Garingella et al. | |
| 7,086,303 B2 | * | 8/2006 | Matsushita | ..................... 74/425 |

FOREIGN PATENT DOCUMENTS

DE     102006016526 A1     10/2007

OTHER PUBLICATIONS

Litvin et al., Face Gear Drive with Helical Involute Pinion: Geometry, Generation by a Shaper and a Worm, Avoidance of Singularities and Stress Analysis, Feb. 2005, 62 pgs.

European Patent Office, International Search Report and Written Opinion issued in counter-part PCT Application No. PCT/IB2010/001450. Date of Mailing: Oct. 5, 2010.

\* cited by examiner

*Primary Examiner* — David D Le
*Assistant Examiner* — Colby M Hansen
(74) *Attorney, Agent, or Firm* — Dykema Gossett PLLC

(57) ABSTRACT

A differential includes a side gear comprising a helical face gear; a helical pinion configured for meshing engagement with the side gear; a pinion housing configured to house the helical pinion; and a first support member configured to support the helical pinion. The side gear rotates around a differential axis. The helical pinion has a first end and a second end opposing the first end. The pinion housing comprises a generally annular ring and includes an outer radial surface; an inner radial surface; and an aperture extending radially inwardly from the outer radial surface. The first support member is disposed radially inwardly relative to the inner radial surface of the pinion housing. In some embodiments, the differential further includes a second support member configured to support the helical pinion. The second support member is disposed radially outwardly relative to the outer radial surface of the pinion housing.

35 Claims, 7 Drawing Sheets

GEAR SET FOR DIFFERENTIAL

CROSS REFERENCE TO RELATED APPLICATIONS

This application claims the benefit of U.S. provisional application No. 61/187,764, filed 17 Jun. 2009, which is hereby incorporated by reference as though fully set forth herein.

TECHNICAL FIELD

The present invention relates to a differential including a first gear comprising a helical face gear, a second gear comprising a helical pinion configured to be in meshing engagement with the helical face gear, a pinion housing configured to house the helical pinion, and a support member configured to support the helical pinion.

BACKGROUND

Helical face gears for use in differentials are known in the art, as set forth for example, in U.S. Pat. Nos. 3,253,483 and 4,791,832. However, the incorporation of helical face gears into differentials has not been commonly utilized because of, for example, challenges with respect to the strength of the gears, the expense in manufacturing gear components with acceptable tolerances, and the difficulty in ensuring equal torque sharing among the gear components.

In a differential including a helical face gear, a helical pinion, and a pinion housing, the differential may be configured to split torque among multiple helical pinions that may be disposed within the pinion housing. The pinion housing may comprise a generally annular ring having at least one aperture extending radially inwardly from an outer radial surface of the pinion housing. Each aperture may comprise a blind aperture that is closed by a wall defining an inner radial surface of the pinion housing. A helical pinion may be disposed in each blind aperture. Each helical pinion may include a protrusion at one end of the helical pinion that is designed for the purpose of piloting or guiding the pinion within the pinion housing. The protrusion may extend in the direction along the longitudinal axis of the helical pinion. The protrusion may be smaller in diameter than the diameter of the helical pinion. The small diameter of the protrusion may result in relatively poor piloting of the helical pinion. The end of the helical pinion that includes the protrusion may be in contact with the wall of the pinion housing that defines an inner radial surface of the pinion housing. Due to friction between the contacting surfaces of the end of the helical pinion and the pinion housing, heat may be generated. The heat exchange between the components of the differential may be poor due to the thin wall of the pinion housing at the area of contact with the helical pinion. In addition, the gear components may encounter errors caused by the manufacturing of gear components, the assembly of the differential, and/or the deformation of gear components under an operating load, all of which may be unavoidable and may cause unequal torque sharing among the pinions of a differential. When there is unequal torque sharing among the pinions of a differential, this may result in low torque capacity. In addition, the use of a blind aperture may result in more difficult manufacturing of the pinion housing. Because the longitudinal axis of the blind aperture may need to be aligned with the longitudinal axis of the helical pinion itself as well as the longitudinal axis of the protrusion on the helical pinion, the tolerances for the pinion housing and the helical pinion is very tight, further complicating manufacturing of the differential.

It may be advantageous to improve piloting of the helical pinion in the pinion housing and to optimize torque sharing among multiple helical pinions that may be disposed in the pinion housing, both of which may result in significantly higher torque capacity of the differential. It may also be advantageous to improve the conditions of heat exchange in the areas of the differential where friction is generated because of the contacting surfaces of the helical pinion and the pinion housing. In addition, it may be advantageous to improve the manufacturability of the differential without requiring costly changes in manufacturing methods to increase accuracy for manufacturing of helical pinions and the pinion housing that may not be commercially viable in the high volume production of differential with gear sets with split torque.

SUMMARY

A differential may include a side gear comprising a helical face gear; a helical pinion configured for meshing engagement with the side gear; a pinion housing configured to house the helical pinion; and a first support member configured to support the helical pinion. The side gear may rotate around a differential axis. The helical pinion may have a first end and a second end opposing the first end. The pinion housing may comprise a generally annular ring and may include: an outer radial surface; an inner radial surface; and an aperture extending radially inwardly from the outer radial surface. The first support member may be disposed radially inwardly relative to the inner radial surface of the pinion housing. In some embodiments, the differential may further include a second support member configured to support the helical pinion. The second support member may be disposed radially outwardly relative to the outer radial surface of the pinion housing.

A differential may include a side gear comprising a helical face gear; a helical pinion configured for meshing engagement with the side gear; a pinion housing configured to house the helical pinion; a first support member configured to support the helical pinion; and a second support member configured to support the helical pinion. The side gear may rotate around a differential axis. The helical pinion may have a first end and a second end opposing the first end. The he pinion housing may comprise a generally annular ring and may include: an outer radial surface; an inner radial surface; and an aperture extending radially inwardly from the outer radial surface through the inner radial surface so that the aperture is open at both a first end of the aperture and a second end of the aperture. The second end of the aperture may oppose the first end of the aperture. The first support member may engage the first end of the helical pinion and may be disposed radially inwardly relative to the inner radial surface of the pinion housing. The second support member may engage the second end of the helical pinion and may be disposed radially outwardly relative to the outer radial surface of the pinion housing.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
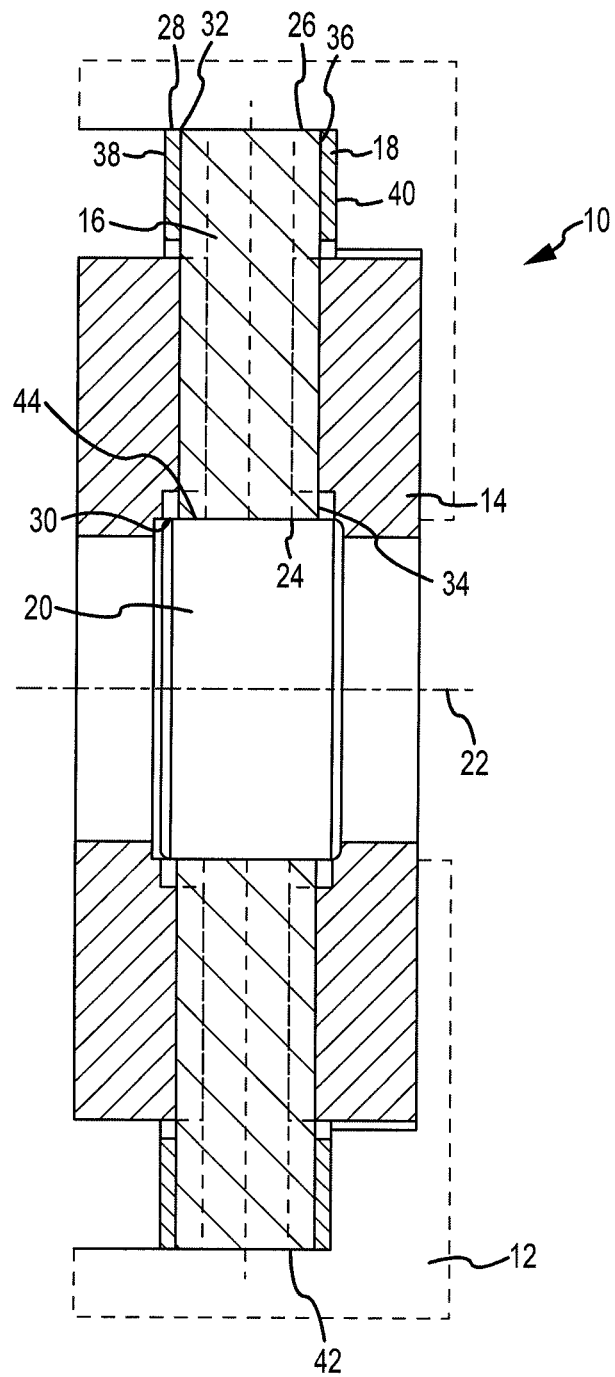
FIG. 1 is a side cross-sectional view of a differential in accordance with an embodiment of the invention.

FIG. 1 generally illustrates an embodiment of differential 10 shown in accordance with teachings of the present invention. Differential 10 may comprise a differential case 12, a side gear 14, a helical pinion 16, pinion housing 18, and a first support member 20 in accordance with an embodiment of the invention. Differential case 12 may be conventional in the art and may be provided to house side gear 14, helical pinion 16, pinion housing 18, and first support member 20, as well any number of other components of the differential 10.

Side gear 14 may comprise a helical face gear. Accordingly, side gear 14 may include a number of helical teeth. The number of helical teeth and the geometry of the tooth flank of the helical teeth of the side gear 14 may vary in accordance with various embodiments of the invention. The use of forging technology in place of machine-cutting technology for the side gears 14 may significantly improve the strength of side gears 14. Accordingly, the helical face gears comprising the side gears 14 may be robust and well-supported. The use of high strength helical face gears may allow for higher torque application and provide a wider range of torque bias ratio. Side gear 14 may rotate around a differential axis 22. A first and second side gear 14 may be disposed on opposing sides of the pinion housing 18 in accordance with an embodiment of the invention. Each side gear 14 may include an annular hub portion (not shown) with an inner radial surface that includes a plurality of splines. The annular hub portion may be configured to receive an axle shaft (not shown) of a motor vehicle such that the axle shafts may connect to side gears 14 through a splined interconnection.

Helical pinion 16 may be configured for meshing engagement with the side gear 14. Helical pinion 16 may have a first end 24 and a second end 26. The second end 26 may oppose the first end 24. Helical pinion 16 may include a number of helical teeth. The number of helical teeth and the geometry of the tooth flank of the helical teeth of helical pinion 16 may vary in accordance with various embodiments of the invention. The helical pinion 16 may be generally cylindrical in accordance with an embodiment of the invention, although the shape of the helical pinion 16 may vary in accordance with various embodiments of the invention. There may be a plurality of pinions 16 in some embodiments of the invention. The number of the pinions 16 in the differential 10 may vary. However, there may generally be at least two pinions 16. The number of pinions 16 may be about three or four in an embodiment, although greater or fewer pinions 16 may be used in other embodiments.

Pinion housing 18 may be configured to house and/or locate helical pinion 16. In particular, the pinion housing 18 may be configured to house and/or locate the helical pinion 16 to be in operative or meshing engagement with side gear 14. In accordance with an embodiment of the invention, pinion housing 18 may be configured to house and/or locate multiple helical pinions 16. The helical pinions 16 may be circumferentially spaced around the circumference of the pinion housing 18. Pinion housing 18 may be made from one piece of material (e.g., comprise a unitary, integral, and/or monolithic structure) in accordance with an embodiment of the invention. Pinion housing 18 may be generally ring shaped in accordance with an embodiment of the invention. In particular, pinion housing 18 may comprise a generally annular ring. Pinion housing 18 may include an outer radial surface 28 and an inner radial surface 30. The outer radial surface 28 may extend circumferentially around the pinion housing 18. Pinion housing 18 may also include an aperture 32. In accordance with an embodiment of the invention, pinion housing 18 may include a plurality of apertures 32. For example only, and without limitation, there may be approximately three or four apertures 32 extending through the pinion housing 18. Although three or four apertures 32 are mentioned in detail, there may be fewer or more apertures 32 in other embodiments of the invention. The apertures 32 may be equiangularly spaced around the circumference of the pinion housing 18. Although the apertures 32 are described as being equiangularly spaced around the circumference of the pinion housing 18, the apertures 32 may be spaced in any alternate arrangements and/or configurations in other embodiments of the invention.

The aperture 32 may have an axis that extends substantially radially outwardly from the approximate center of the pinion housing 18. The aperture 32 may extend radially inwardly from the outer radial surface 28. In accordance with an embodiment of the invention, the aperture 32 may extend from the outer radial surface 28 of the pinion housing 18 through the inner radial surface 30 of the pinion housing 18. Accordingly, the aperture 32 may be open both at a first end 34 of the aperture 32 and a second end 36 of the aperture 32. The first end 34 of the aperture 32 may oppose the second end 36 of the aperture 32. By utilizing apertures 32 that may be machined through the whole body of the pinion housing 18, rather than comprising a blind aperture, the manufacturing of the pinion housing 18 and the machining of the apertures 32 may be less complex. For example, apertures 32 may be machined in a single set up, which may eliminate a significant source of manufacturing errors. Helical pinion 16 may be disposed in the aperture 32. The absence of a protrusion on an end of the helical pinion 16, as well as the elimination of a source of manufacturing errors by machining in a single set up, may allow for reliable and correct piloting of the helical pinion within aperture 32. Correct piloting of the helical pinions 16 is critical for proper operation of the differential 10. The number of helical pinions 16 may generally correspond to the number of apertures 32 in the pinion housing 18, although fewer pinions 16 in relation to the number of apertures 32 may be used in embodiments of the invention. In these embodiments of the invention, at least one or more of the apertures 32 may remain open. The size of pinions 16 may also vary, but may generally be sized so as to fit operatively within the apertures 32 of the pinion housing 18 so as to allow the pinions 16 to be free to rotate within apertures 32.

The pinion housing 18 may further comprise a first face 38 and a second face 40. The first face 38 may oppose the second face 40. The pinion housing 18 may further include a channel 42 extending from the first face 38 to the second face 40 of the generally annular ring of the pinion housing 18. The channel 42 may be substantially radially aligned with the aperture 32. Further, the number of channels 42 may generally correspond to the number of apertures 32 in the pinion housing 18, although fewer or more channels 42 than the number of apertures 32 may be used in embodiments of the invention. The helical face of each side gear 14 may face pinion housing 18. The side gears 14 may be configured to be in operative or meshing engagement with the pinions 16. In particular, the helical teeth of the side gears 14 may be in an operative, or meshing, engagement with the helical teeth of the pinions 16. Both the helical teeth of the side gears 14 and the helical teeth of the pinions 16 may extend into channels 42 in the pinion housing 18. With a configured meshing engagement between the pinions 16 and the side gears 14, the side gears 14 may be forced to turn about their axis (i.e., differential axis 22). The side gears 14 may be configured to transmit torque from the pinions 16 to an output (e.g., axle shafts of a motor vehicle). Because the output (e.g., axles shafts) are grounded and coupled to the side gears 14, a motor vehicle incorporating the differential 10 may move. When the side gears 14 rotate at different speeds by grounding through the output (e.g., axle shafts), the pinions 16 may rotate within the pinion housing 18 and in mesh with the side gears 14 to compensate.

First support member 20 may be configured to support the helical pinion 16. In particular, the first support member 20 may be configured to restrain the helical pinions 16 from axial movement. The helical pinions 16 may generally be axially trapped between the first support member 20 and an inner surface of the differential case 12 in accordance with an embodiment of the invention as generally illustrated in FIG. 1. The pinion housing 18 may exert pressure on the helical pinions 16 to move them around and/or about the differential axis 22 (i.e., an axial center line of the side gears 14). First support member 20 may be disposed radially inwardly relative to the inner radial surface 30 of the pinion housing 18. Accordingly, first support member 20 may be considered an inner support for helical pinions 16. First support member 20 may be generally round in shape. First support member 20 may be a solid cylindrical element in accordance with an embodiment of the invention as generally illustrated in FIG. 1. First support member 20 may include a central bore in accordance with other embodiments of the invention. First support member 20 may include an outer surface 44 that extends circumferentially around the inner radial surface 30 of the pinion housing 18, such that the first support member 20 faces the end 34 of each of the apertures 32 of pinion housing 18. In accordance with an embodiment of the invention as generally illustrated in FIG. 1, first support member 20 of differential 10 may engage the inner radial surface 30 of the pinion housing 18. In particular, the outer surface 44 of the first support member 20 may engage the inner radial surface 30 of the pinion housing 18. In other words, the first support member 20 may only be configured to rotate about its axis and is not capable of floating in relation to the pinion housing 18. In the embodiment generally illustrated in FIG. 1, first support member 20 of differential 10 may also engage first end 24 of helical pinion 16. In particular, the outer surface 44 of the first support member 20 may engage first end 24 of helical pinion 16. Because of the large surface area of the first support member 20 that is contacting the first end 24 of the helical pinion 16, heat exchange between the components of the differential may be significantly improved.

Figure 2:
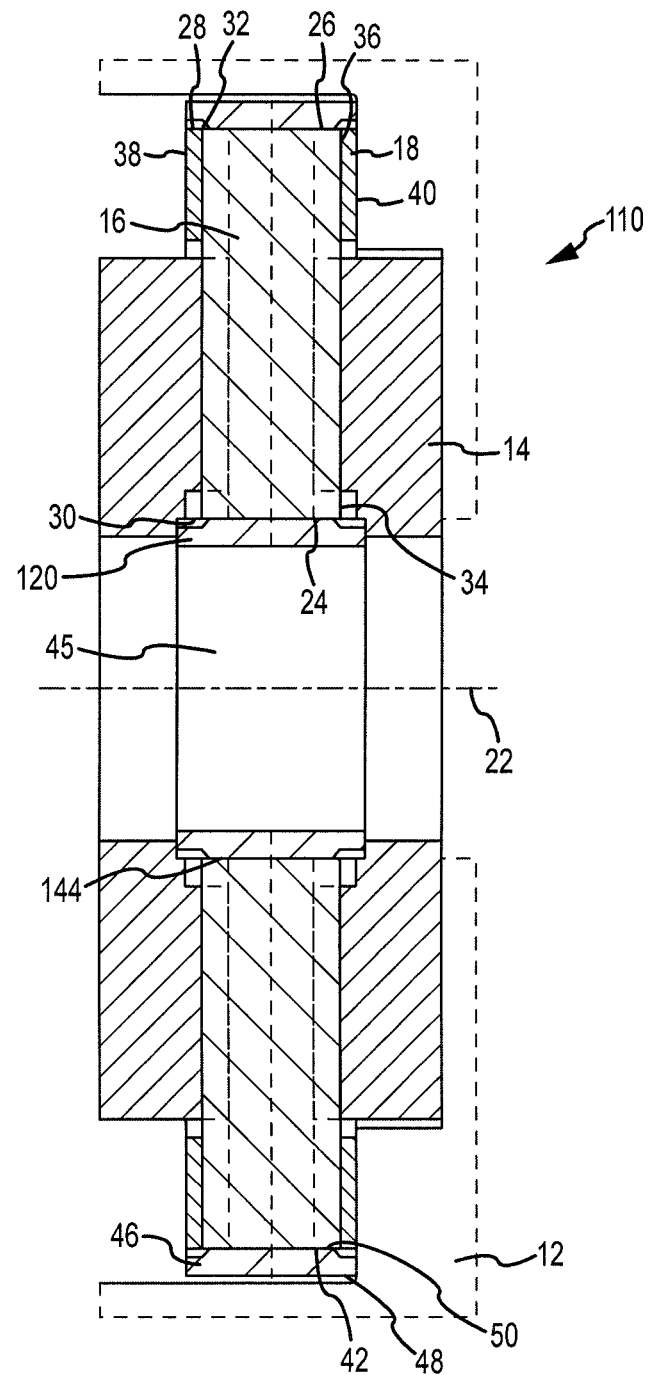
FIG. 2 is a side cross-sectional view of a differential in accordance with an embodiment of the invention.

In accordance with another embodiment of the invention as generally illustrated in FIG. 2, the differential 110 may be substantially identical to the embodiment generally illustrated in FIG. 1 except for modification to the first support member 120 and the inclusion of a second support member 46. In accordance with the embodiment of the invention as generally illustrated in FIG. 2, the first support member 120 of differential 110 may be modified so as to not engage the inner radial surface 30 of the pinion housing 18. However, the first support member 120 of differential 110 may still engage first end 24 of helical pinion 16. In particular, the outer surface 144 of the first support member 120 may engage first end 24 of helical pinion 16. In this embodiment, the first support member 120 does not engage the pinion housing 18 and may be capable of floating in relation to the pinion housing 18. In this embodiment, equal torque sharing among all of the helical pinions 16 may be possible. First support member 120 may comprise a solid cylindrical element in accordance with an embodiment of the invention. First support member 120 may include a central bore 45 in accordance with other embodiments of the invention. The central bore 45 may be configured to improve serviceability of the differential 110. Any of differentials 10, 110, 210, 310 as described herein may utilize a first support member 20, 120, 220, 320 with a central bore 45 or comprising a solid cylindrical element.

Figure 3:
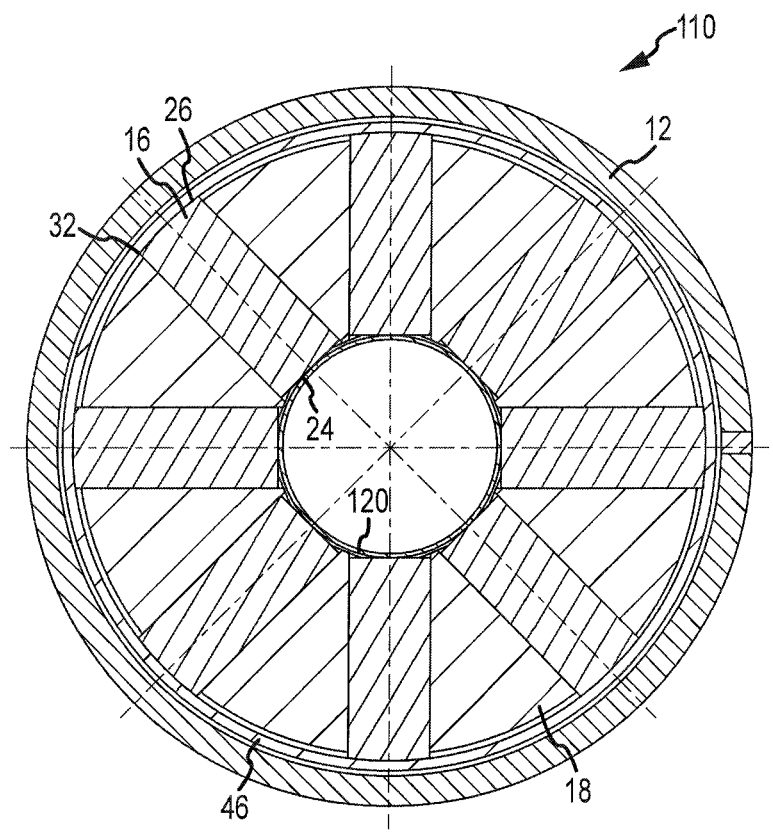
FIG. 3 is a front cross-sectional view of the differential of FIG. 2.

In accordance with the embodiment of the invention as generally illustrated in FIGS. 2-3, the differential 110 further comprises a second support member 46. Second support member 46 may also be configured to support the helical pinion 16. In particular, the second support member 46 may be configured to restrain the helical pinions 16 from axial movement. The helical pinions 16 may generally be axially trapped between the first support member 120 and the second support member 46 in accordance with an embodiment of the invention. Second support member 46 may be disposed radially outwardly relative to the outer radial surface 28 of the pinion housing 18. Accordingly, second support member 46 may be considered an outer support for helical pinions 16. Second support member 46 may be generally round in shape. Second support member 46 may include an outer surface 48 that extends circumferentially around an inner radial surface of the differential case 12. Second support member 46 may also include an inner surface 50 that extends circumferentially around the outer radial surface 28 of the pinion housing 18, such that the second support member 46 faces the end 36 of each of the apertures 32 of pinion housing 18. In accordance with an embodiment of the invention, the second support member 46 of differential 110 may not engage the outer radial surface 28 of the pinion housing 18. However, the second support member 46 may engage the helical pinion 16. In particular, the second support member 46 may engage the second end 26 of the helical pinion 16. In this embodiment, the second support member 46 does not engage the pinion housing 18 and may be capable of floating in relation to the pinion housing 18. In this embodiment, equal torque sharing among all of the helical pinions 16 may be possible.

In connection with a differential 110 that may include four or more helical pinions 16, the first support member 120 and the second support member 46 may comprise a flexible material. The flexible material may be capable of elastic deformation in accordance with an embodiment. The use of a flexible material may allow the first and second support members 120, 46 to function like a leaf spring. Due to manufacturing errors, the helical pinions 16 may not be loaded in their axial direction equally. Those helical pinions 16 that are more heavily loaded may elastically deform one or both of the first and second supports 120, 46. Elastic deformation of one or both of the first and second supports 120, 46 may allow for absorption of the negative impact of manufacturing errors onto the torque performance of the differential 110. Even if the first and second supports 120, 46 comprise a flexible material, the stiffness and rigidity of the first and second supports 120, 46 is large enough to withhold the functional loads placed on the first and second supports 120, 46. However, the stiffness and rigidity of the first and second supports 120, 46 is small enough to allow for elastic deformation to enable the load to be shared substantially evenly among all of the helical pinions 16. Steel may be used as a flexible material for the first support member 120 and the second support member 46 in accordance with an embodiment of the invention. Although steel is mentioned in detail, any number of other flexible materials could be used in accordance with other embodiments of the invention. Although the use of flexible material for support members 120, 46 is described in connection with a differential 110 that has four or more helical pinions 16, one or both of support members 120, 46 may comprise a flexible material in accordance with any number of other embodiments of the invention which has fewer helical pinions 16. Moreover, although the use of flexible material is described only for support members 120, 46 in connection with differential 110, the use of flexible material may be used in connection with the support members (e.g., first support member 20) of any other embodiment of the invention described herein.

Referring now to FIG. 3, a front cross-sectional view of differential 110 is generally illustrated. Differential 110 may comprise about eight helical pinions 16 in accordance with the embodiment as generally illustrated. Although eight pinions are mentioned in detail, the differential 110 may include fewer or more pinions in accordance with other embodiments of the invention. The helical pinions 16 may interact with the first support member 120 and with the second support member 46. The first support member 120 may include a centerline $CL_{sup1}$, and the second support member 46 may include a center line $CL_{sup2}$. Under axial thrust exerted by the helical pinions 16 and the side gear 14, the helical pinions 16 may be pushed outwards (i.e., radially outwardly substantially along an axis of the helical pinion toward second support member 46) or inwards (i.e., radially inwardly substantially along an axis of the helical pinion toward first support member 120), depending on whether a vehicle incorporating differential 110 makes a right turn or a left turn. In an ideal case where there are no manufacturing errors/deviations (which is not commercially viable), the axial displacement of all of the helical pinions 16 may be about equal in length. This may result in uniform elastic deformation of the first and second support members 120, 46. However, in a case where there are manufacturing errors/deviations, each of the helical pinions 16 may be displaced a certain distance substantially along the axis of the helical pinion, and the axial displacement of each helical pinion 16 may be of a different value. Because the first and second support members 120, 46 are flexible, the axial thrust on the helical pinions 16 may be about equal to each other. In this way, substantially even load sharing among all of the helical pinions 16 may be attained. Because the first and second support members 120, 46 may be flexible and may be configured to absorb manufacturing deviations by allowing for the axial thrust on the helical pinions 16 to be about equal to each other. Accordingly, the differential 110 may be relatively insensitive to manufacturing deviations, the helical pinions 16 may share a substantially equal load, and the power capacity of the differential 110 may be significantly increased.

Figure 4:
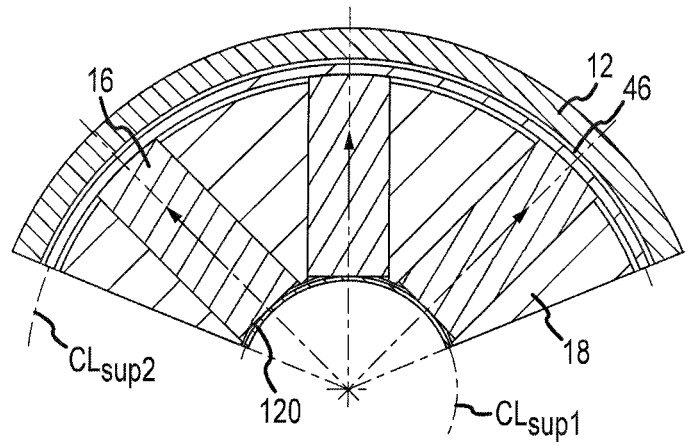
FIG. 4 is a partial front cross-sectional view of the differential of FIG. 2.
Figure 5:
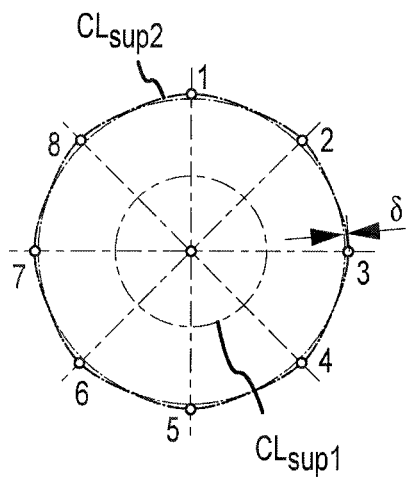
FIG. 5 is a schematic drawing of the axial displacement of at least one helical pinion of the differential of FIG. 4 in the case of zero manufacturing deviations.
Figure 6:
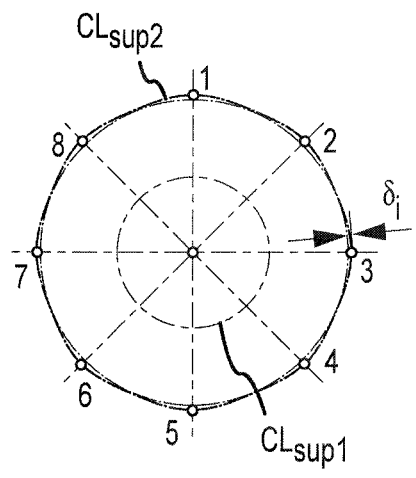
FIG. 6 is a schematic drawing of the axial displacement of at least one helical pinion of the differential of FIG. 4 in the case of at least some manufacturing deviations.

Referring now to FIG. 4, when a vehicle incorporating differential 110 makes a left turn, the helical pinions 16 may be loaded outward as schematically depicted. For the ideal differential having zero manufacturing errors/deviations (which is not commercially viable), all of the helical pinions 16 may be displaced under the load at an equal displacement $\beta$ as generally illustrated in FIG. 5. However, in a case where there are manufacturing errors/deviations (which is inevitable), each helical pinion 16 may be displaced at its own axial displacement $\beta_i$ as generally illustrated in FIG. 6, where i=1 . . . N and N is the total number of the helical pinions 16.

Figure 7:
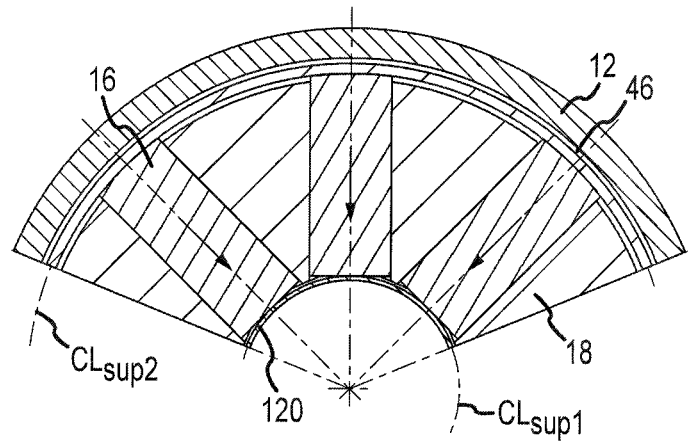
FIG. 7 is a partial front cross-sectional view of the differential of FIG. 2.
Figures 8, 9:
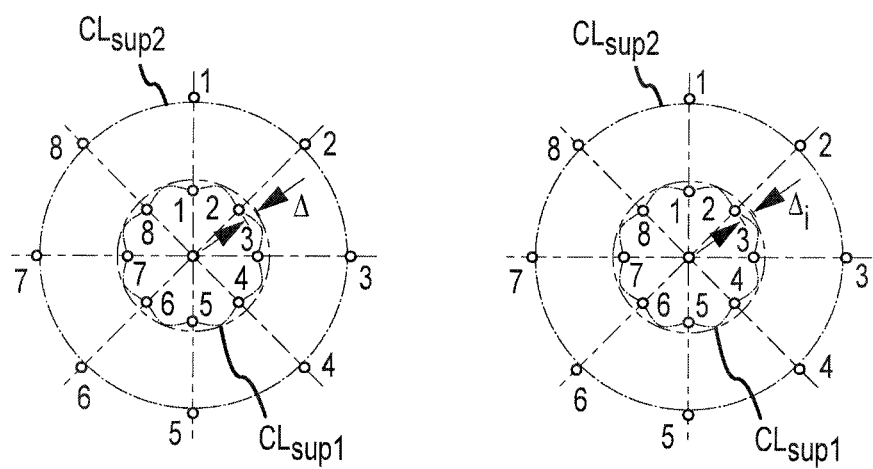
FIG. 8 is a schematic drawing of the axial displacement of at least one helical pinion of the differential of FIG. 7 in the case of zero manufacturing deviations.
FIG. 9 is a schematic drawing of the axial displacement of at least one helical pinion of the differential of FIG. 7 in the case of at least some manufacturing deviations.

Referring now to FIG. 7, when a vehicle incorporating differential 110 makes a right turn, the helical pinions 16 may be loaded inward as schematically depicted. For the ideal differential having zero manufacturing errors/deviations (which is not commercially viable), all of the helical pinions 16 may be displaced under the load at an equal displacement $\Delta$ as generally illustrated in FIG. 8. However, in a case where there are manufacturing errors/deviations (which is inevitable), each helical pinion 16 may be displaced at its own axial displacement $\Delta_i$ as generally illustrated in FIG. 9, where i=1 . . . N and N is the total number of the helical pinions 16.

Figure 10:
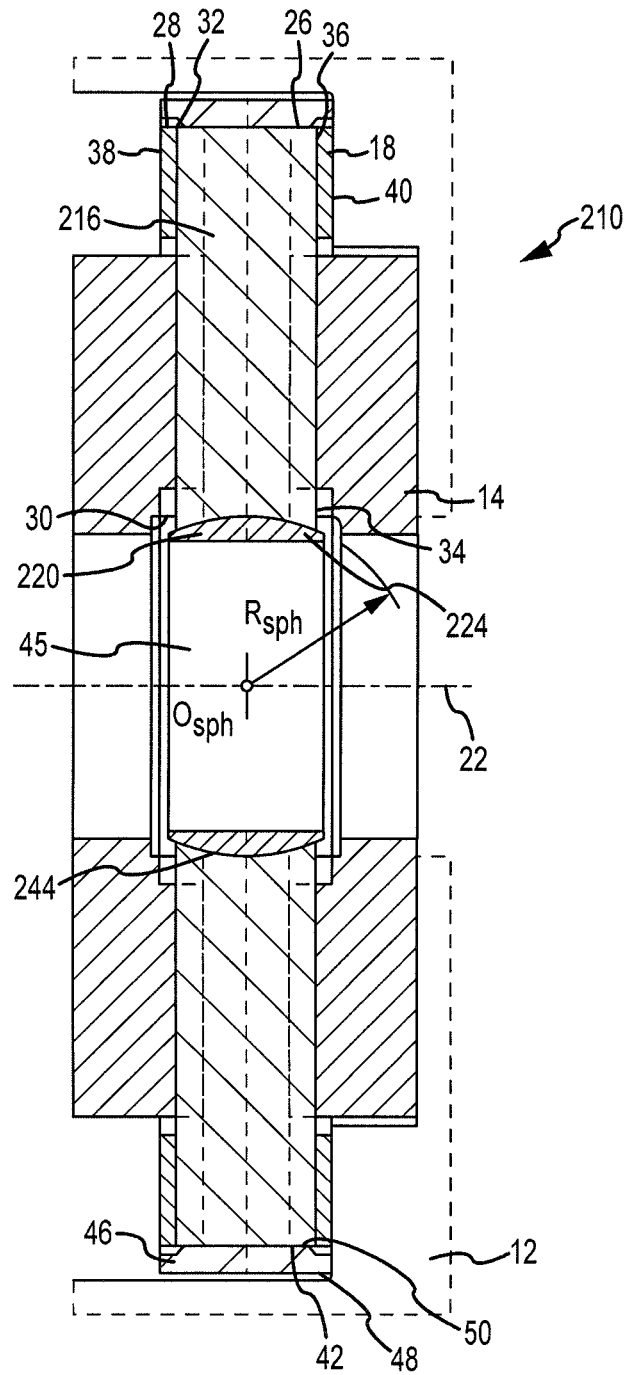
FIG. 10 is a side cross-sectional view of a differential in accordance with an embodiment of the invention.

In accordance with another embodiment of the invention as generally illustrated in FIG. 10, the differential 210 may be substantially identical to the embodiment generally illustrated in FIG. 2 except for modification to the helical pinion 216 and the first support member 220. In particular, the modified helical pinion 216 may have a first end 224 that has a substantially spherical shape. The radius of curvature $R_{sph}$ of the substantially spherical shape may be defined by a sphere having a center $O_{sph}$ at the differential axis 22. The first end 224 of the helical pinion 216 may be substantially concave in accordance with an embodiment of the invention. The modified first support member 220 may include an outer surface 244 that extends circumferentially around the inner radial surface 30 of the pinion housing 18, such that the first support member 220 faces the end 34 of each of the apertures 32 of pinion housing 18. The outer surface 244 of the first support member 220 may also have a substantially spherical shape. The radius of curvature of the substantially spherical shape may also be defined by a sphere having a center $O_{sph}$ at the differential axis 22. The outer surface 244 of the first support member 220 may be substantially convex in accordance with an embodiment of the invention. As in some other embodiments, the first support member 220 of differential 210 may not engage the inner radial surface 30 of the pinion housing 18. Instead, the outer surface 244 of the first support member 220 may engage the first end 224 of helical pinion 216. In accordance with the modified embodiment generally illustrated in FIG. 3, the helical pinion 216 and the first support member 220 make surface contact, instead of point contact. Surface contact may allow for a significant reduction of contact pressure on the interacting surfaces of the helical pinion 216 and the first support member 220. The embodiment generally illustrated in FIG. 10 may be used in cases when manufacturing errors of the differential 210 are negligibly small, and misalignment of the spherical surfaces of the first support member 220 and of the first end 224 of helical pinion 216 does not negatively affect the bearing capacity of the spherical contact of the interacting surfaces of the helical pinion 216 and the first support member 220.

Figure 11:
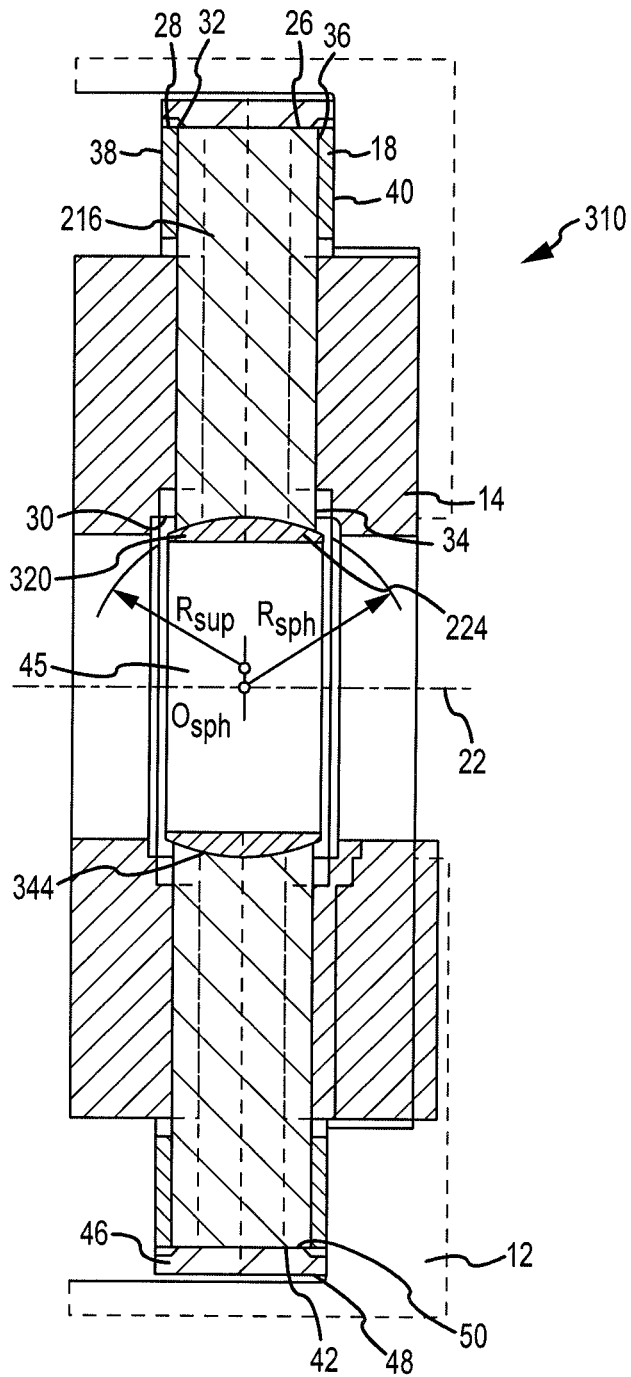
FIG. 11 is a side cross-sectional view of a differential in accordance with an embodiment of the invention.

In accordance with another embodiment of the invention as generally illustrated in FIG. 11, the differential 310 may be substantially identical to the embodiment generally illustrated in FIG. 10 except for modification to the first support member 320. The modified first support member 320 may include an outer surface 344 that extends circumferentially around the inner radial surface 30 of the pinion housing 18, such that the first support member 320 faces the end 34 of each of the apertures 32 of pinion housing 18. The outer surface 344 of the first support member 320 may have a substantially spherical shape. However, the radius of curvature $R_{sup}$ of the substantially spherical shape of first support member 320 may be less than the radius of curvature $R_{sph}$ of a sphere having a center $O_{sph}$ at the differential axis 22. The outer surface 344 of the first support member 320 may be substantially convex in accordance with an embodiment of the invention. By having the radius of curvature $R_{sup}$ of the first support member 320 be smaller as compared to the radius of curvature $R_{sph}$ of the sphere having a center $O_{sph}$ at the differential axis 22, there may be improved lubrication of the contacting surfaces of the end 224 of the helical pinion 216 and the outer surface 344 of the first support member 320. The improved condition of lubrication may be due to the so-called elasto-hydrodynamic effect (EHD effect). In accordance with the elasto-hydrodynamic effect, the opposed surfaces of the end 224 of the helical pinion 216 and the outer surface 344 of the first support member 320 may be separated, but there may be some interaction between asperities on the opposing surfaces, and there may be an elastic deformation on the contacting surface enlarging the load bearing area, whereby the viscous resistance of the lubricant becomes capable of supporting the load. One of ordinary skill in the art may determine a desirable reduction in the radius of curvature $R_{sup}$ of the substantially spherical shape of first support member 320 as compared to the radius of curvature $R_{sph}$ of a sphere having a center $O_{sph}$ at the differential axis 22 by locating and using methods developed in accordance with the theory of elasto-hydrodynamic lubrication.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A differential, comprising:
    a side gear comprising a helical face gear, wherein the side gear rotates around a differential axis;
    a helical pinion configured for meshing engagement with the side gear, the helical pinion being rotatable about a rotational axis and having a first end surface and a second end surface opposing the first end surface, wherein the first and second end surfaces are generally perpendicular to the rotational axis;
    a pinion housing configured to house the helical pinion, the pinion housing comprising a generally annular ring and including:
        an outer radial surface;
        an inner radial surface; and
        an aperture extending radially inwardly from the outer radial surface; and
    a first support member configured to support the helical pinion, wherein the first support member has an outer surface and is disposed radially inwardly relative to the inner radial surface of the pinion housing, and wherein the first end surface of the helical pinion abuts the outer surface of the first support member.

2. The differential of claim 1, wherein the helical pinion is disposed in the aperture.

3. The differential of claim 1, wherein the pinion housing further comprises:
    a first face;
    a second face opposing the first face; and
    a channel extending from the first face to the second face of the pinion housing, wherein the channel is substantially radially aligned with the aperture.

4. The differential of claim 1, wherein the aperture extends from the outer radial surface of the pinion housing through the inner radial surface of the pinion housing so that the aperture is open at both a first end of the aperture and a second end of the aperture, the second end opposing the first end.

5. The differential of claim 1, wherein the first support member is generally round.

6. The differential of claim 1, wherein the first support member engages the inner radial surface of the pinion housing.

7. The differential of claim 1, wherein the first support member includes a central bore.

8. The differential of claim 1, wherein the first support member does not contact the inner radial surface of the pinion housing.

9. The differential of claim 1, further comprising a second support member configured to support the helical pinion, wherein the second support member is disposed radially outwardly relative to the outer radial surface of the pinion housing.

10. The differential of claim 9, wherein the second support member is generally round.

11. The differential of claim 9, wherein the second support member does not contact the outer radial surface of the pinion housing.

12. The differential of claim 9, wherein the second end surface of the helical pinion abuts the second support member.

13. The differential of claim 1, wherein at least one of the first end surface and the second end surface of the helical pinion has a substantially spherical shape.

14. The differential of claim 13, wherein a radius of curvature of the substantially spherical shape on said at least one of the first end surface and the second end surface of the helical pinion is defined by a sphere having a center at the differential axis.

15. The differential of claim 1, wherein an outer surface of the first support member has a substantially spherical shape.

16. The differential of claim 15, wherein a radius of curvature of the substantially spherical shape on the outer surface of the first support member is defined by a sphere having a center at the differential axis.

17. The differential of claim 15, wherein the substantially spherical shape on the outer surface of the first support member has a radius of curvature that is less than the radius of curvature of a sphere having a center at the differential axis.

18. The differential of claim 1, wherein the first support member comprises a flexible material.

19. The differential of claim 9, wherein the second support member comprises a flexible material.

20. A differential, comprising:
    a side gear comprising a helical face gear, wherein the side gear rotates around a differential axis;
    a helical pinion configured for meshing engagement with the side gear, the helical pinion being rotatable about a rotational axis and having a first end surface and a second end surface opposing the first end surface, wherein the first and second end surfaces are generally perpendicular to the rotational axis;
    a pinion housing configured to house the helical pinion, the pinion housing comprising a generally annular ring and including:
        an outer radial surface;
        an inner radial surface; and
        an aperture extending radially inwardly from the outer radial surface through the inner radial surface so that the aperture is open at both a first end of the aperture and a second end of the aperture, the second end opposing the first end;
    a first support member configured to support the helical pinion, wherein the first support member has an outer surface and is disposed radially inwardly relative to the inner radial surface of the pinion housing and wherein the first end surface of the helical pinion abuts the outer surface of the first support member; and
    a second support member configured to support the helical pinion, wherein the second support member has an inner surface and is disposed radially outwardly relative to the outer radial surface of the pinion housing and wherein the second end surface of the helical pinion abuts the second support member.

21. The differential of claim 20, wherein the helical pinion is disposed in the aperture.

22. The differential of claim 20, wherein the pinion housing further comprises:
    a first face;
    a second face opposing the first face; and
    a channel extending from the first face to the second face of the pinion housing, wherein the channel is substantially radially aligned with the aperture.

23. The differential of claim 20, wherein the first support member is generally round.

24. The differential of claim 20, wherein the first support member engages the inner radial surface of the pinion housing.

25. The differential of claim 20, wherein the first support member includes a central bore.

26. The differential of claim 20, wherein the first support member does not contact the inner radial surface of the pinion housing.

27. The differential of claim 20, wherein the second support member is generally round.

28. The differential of claim 20, wherein the second support member does not contact the outer radial surface of the pinion housing.

29. The differential of claim 20, wherein at least one of the first end surface and the second end surface of the helical pinion has a substantially spherical shape.

30. The differential of claim 29, wherein a radius of curvature of the substantially spherical shape on said at least one of the first end surface and the second end surface of the helical pinion is defined by a sphere having a center at the differential axis.

31. The differential of claim 20, wherein an outer surface of the first support member has a substantially spherical shape.

32. The differential of claim 31, wherein a radius of curvature of the substantially spherical shape on the outer surface of the first support member is defined by a sphere having a center at the differential axis.

33. The differential of claim 31, wherein the substantially spherical shape on the outer surface of the first support member has a radius of curvature that is less than the radius of curvature of a sphere having a center at the differential axis.

34. The differential of claim 20, wherein the first support member comprises a flexible material.

35. The differential of claim 20, wherein the second support member comprises a flexible material.

* * * * *